(12) United States Patent
Riand (10) Patent No.: US 11,775,675 B2
(45) Date of Patent: Oct. 3, 2023

(54) SYSTEMS AND METHODS OF SECURE DATA INPUT USING A CLOSED SHADOW DOCUMENT OBJECT MODEL (DOM)

(71) Applicant: salesforce.com, inc., San Francisco, CA (US)

(72) Inventor: Philippe Riand, Burlington, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/230,310

(22) Filed: Apr. 14, 2021

(65) Prior Publication Data

US 2022/0335152 A1 Oct. 20, 2022

(51) Int. Cl.
*G06F 21/62* (2013.01)

(52) U.S. Cl.
CPC ...... *G06F 21/6245* (2013.01); *G06F 21/6218* (2013.01)

(58) Field of Classification Search
CPC .................................................. G06F 21/6245
See application file for complete search history.

(56) References Cited

U.S. PATENT DOCUMENTS

| 8,938,732 B2 | 1/2015 | Levine |
| 9,021,035 B2 | 4/2015 | Auriemma |
| 2008/0109784 A1 | 5/2008 | Levine |
| 2009/0037830 A1 | 2/2009 | Kulkarni |
| 2016/0028743 A1* | 1/2016 | Johns ............. G06F 40/143 726/26 |
| 2016/0342997 A1* | 11/2016 | De Tella ............ G06Q 20/382 |
| 2020/0089717 A1* | 3/2020 | Walker ............. G06F 40/154 |
| 2021/0011742 A1* | 1/2021 | Ganchev ........... G06F 9/452 |

OTHER PUBLICATIONS

Ruoti, R., et al., MessageGuard: A Browser-based Platform for Usable, Content-Based Encryption Research, arXiv (Cornell University), p. 1-18, May 16, 2016. (Year: 2016).*

* cited by examiner

*Primary Examiner* — D'Arcy Winston Straub
(74) *Attorney, Agent, or Firm* — Butzel Long

(57) ABSTRACT

Systems and methods are provided for storing, at a storage device communicatively coupled to a computer, one or more operations to be executed for a web browser. A closed shadow document object model (DOM) may be generated by a component of a web page to be displayed in the web browser using the one or more of the stored operations. The closed shadow DOM may be configured to receive sensitive data or restricted data. The component of the web page that receives the sensitive data or restricted data may instantiate an inline frame (iFrame) with a same domain as the component. The web page to receive the sensitive data or restricted data via the instantiated iFrame may be displayed on a displayed device from an input device communicatively coupled to the computer for a component of the web page.

10 Claims, 5 Drawing Sheets

SYSTEMS AND METHODS OF SECURE DATA INPUT USING A CLOSED SHADOW DOCUMENT OBJECT MODEL (DOM)

BACKGROUND

Currently, some websites request that a user enter sensitive data, such as a password, credit card information, medical information, and the like. Such websites can have security flaws, where a malicious third-party can receive the sensitive data entered by the user of the website. Malicious attacks to the web site by the third-party typically start with a script injection in the web page to extract the values input by the user, or to listen for keyboard events to capture the information as it is entered by the user. An attacker can override some built-in application program interfaces (APIs) of a web browser that displays the web page to obtain a reference to objects in the web page and retrieve the sensitive data. An attacker can also override the input value property to obtain access to the value of any input in the page. With current systems, an attacker can also register global events to pierce security boundaries and capture the sensitive data.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Web site and/or web applications may request that a user input sensitive or restricted data, such as a password or credit card information in a web page displayed in a web browser. Implementations of the disclosed subject matter provide protection for the user when entering such sensitive data. One or more original operations from the web browser may be saved before they may be overwritten by an attacker or other malicious third-party. The web page component with the sensitive data input may create a closed shadow document object model (DOM) using one of the saved methods, so that the shadow DOM is not generated by a malicious script that would provide a third-party with access to the closed shadow DOM. By saving the native browser methods, the closed shadow may be securely created by such native browser operations, rather than with third-party operations that may have been injected into the web browser. The closed shadow DOM may be isolated from the main DOM, and may prevent other web components from requesting a pointer, link, or other information from the closed shadow DOM. Within the closed shadow DOM, the component instantiates an iFrame in the same domain, so that the sensitive content executes in its own environment, and not in a global environment. That is, the iFrame is contained within the closed shadow DOM, which protects the sensitive data that is received by the iFrame from the user when it is displayed in the web page. Implementations of the disclosed subject matter ensure that the browser application programming interfaces (APIs) and/or operations are the original ones, and that none of the functions and/or objects have been overridden before the creation of the closed shadow DOM that receives the sensitive data.

Traditionally, one way to protect the data from malicious scripts is to run the form that collects the sensitive and/or restrictive data within a cross-domain iFrame, which isolates such data from the main web page. That is, two different domains are created and used, with one domain for the main web page and a second domain for the iFrame. However, implementing and/or maintaining separate domains for the cross-domain iFrame and the operation of the web page may not be easily performed. For example, if an entity implements and manages many clients with different domains, having a second domain for each client increases the complexity in managing the domains for each client. Additionally, there is increased complexity in managing communications between the cross-domain iFrame and the web page. A shadow DOM can be used to isolate the content of a web component from its container, which is typically a web page. When the shadow DOM is created within a "closed" mode, a script injected into the page by a malicious third-party cannot access the DOM elements. However, the malicious third-party attacker may still override some built-in APIs and/or operations of the web browser, and may obtain a reference to the shadow DOM at runtime. That is, the shadow DOM created using the operations inserted by the malicious third party, rather than using the original web browser operations, and thus may provide the malicious third-party with access to data in the closed shadow DOM and the iFrame that may be within it. With the obtained reference to the shadow DOM, the malicious third-party attacker may receive any sensitive and/or restricted data input by the user to the web site. Alternatively, the malicious third-party attacker may override the input value property to obtain access to the value of any input in the web page, including the closed shadow DOM. With current systems, an attacker can also register global events to pierce the shadow DOM boundaries and capture the sensitive and/or information inputted by the user.

Implementations of the disclosed subject matter generate a closed shadow DOM and an iFrame to receive sensitive and/or restricted data based on stored original browser operations. Such implementations prevent code from malicious third parties from intercepting conventionally-generated iFrames. This may maintain security of the sensitive and/or restricted data from being vulnerable to interception and/or retrieval by malicious third-parties. That is, implementations of the disclosed subject matter improve the security of the web browser and the computer, especially when receiving sensitive information from a user via the website. Using the implementations of the disclosed subject matter, there is no need to create separate domains for the iFrame and the web page, and manage communications between the cross-domain iFrame and the web page as in traditional approaches.

Figure 1:
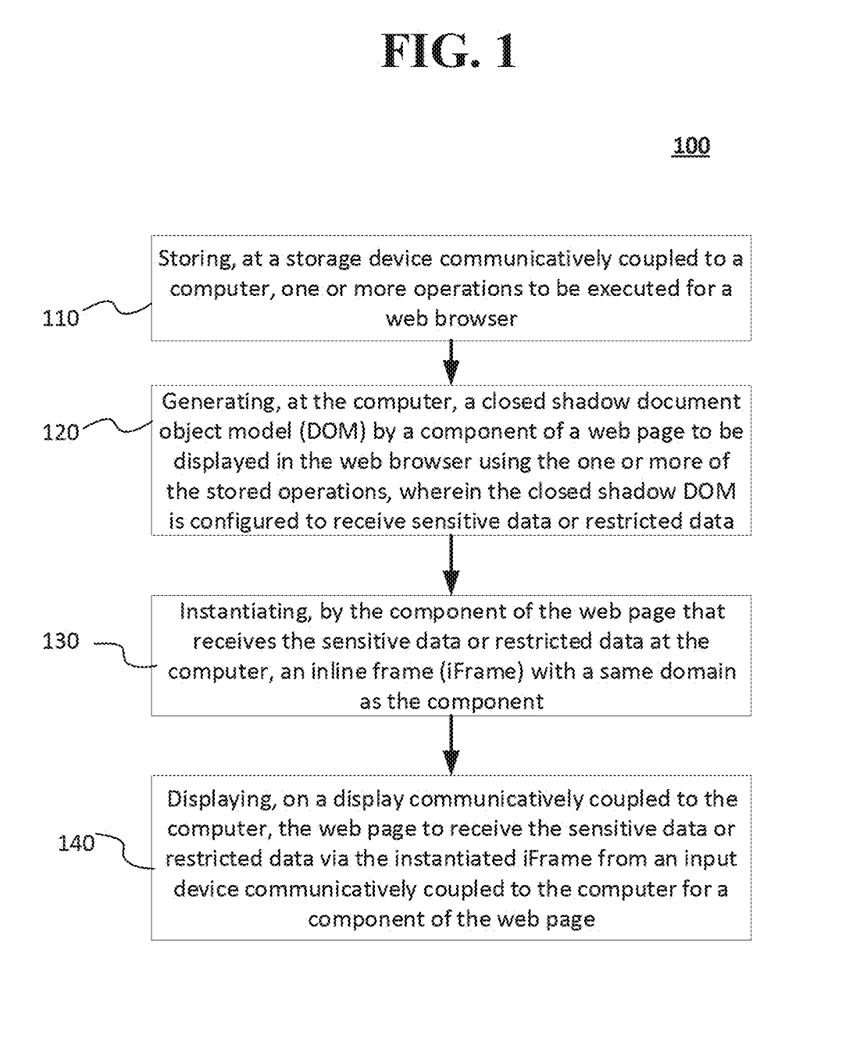
FIG. 1 shows an example method of generating a closed shadow document object model (DOM), instantiating an inline frame (iFrame), and displaying a web page to receive sensitive or restricted data according to implementations of the disclosed subject matter.
Figure 2:
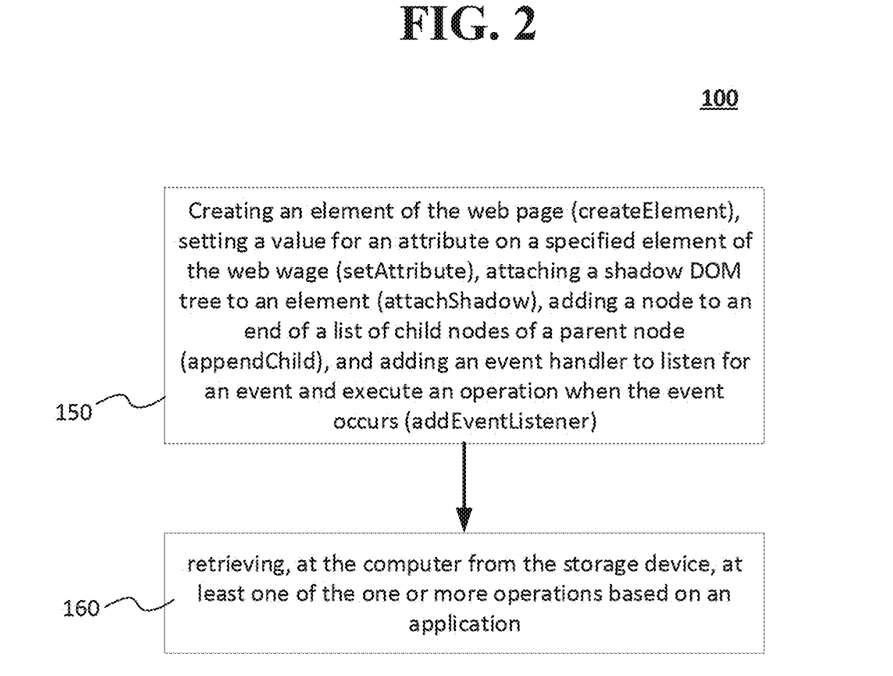
FIGS. 2-3 show additional example operations of the example method 100 of FIG. 1 according to implementations of the disclosed subject matter.
Figure 3:
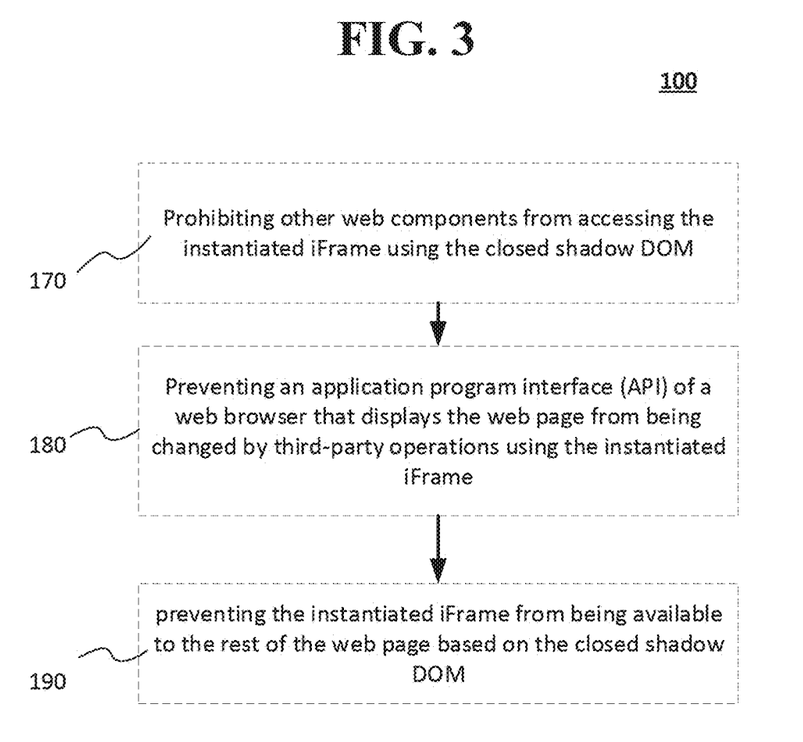

FIGS. 1-3 show an example method 100 of having a web page securely receive sensitive or restricted data according to implementations of the disclosed subject matter. At operation 110, one or more operations to be executed for a web browser may be stored at a storage device communicatively coupled to a computer. For example, the one or more operations may be stored at fixed storage 530, memory 570 and/or removable media 550 of computer 500 shown in FIG. 5. The web browser may be executed by processor 540 of computer 500. Data for a web page to be displayed by the web browser executed by the computer 500 may be received via communications network 600 from server 700 and/or database 800. The web browser and the web page may be displayed on display 520 of computer 500. The sensitive data or restricted data may be a password, bank account information, credit card information, financial account information, personal medical information, and/or personal identification information, or the like.

The operations of the web browser that may be stored in the storage device may include, for example, creating an element of the web page (createElement), setting a value for an attribute on a specified element of the web page (setAttribute), attaching a shadow DOM tree to an element (attachShadow), adding a node to an end of a list of child nodes of a parent node (appendChild), adding an event handler to listen for an event and execute an operation when the event occurs (addEventListener), or the like as shown in operation 150 in FIG. 2, which, in some implementations, may be part of operation 110 of FIG. 1. These are merely example operations of a web browser that may be stored, and other suitable operations may be selected and stored.

At operation 120, the computer may generate a closed shadow document object model (DOM) by a component of a web page to be displayed in the web browser using the one or more of the stored operations. The generated closed shadow DOM may be closed shadow DOM 230 shown in FIG. 4 and discussed below. In some implementations, operation 120 of FIG. 1 may include operation 160 of FIG. 2, where the one or more operations to generate the closed shadow DOM may be retrieved from the storage device based on at least one of the one or more operations of an application. That is, the web application to be executed and/or displayed in the web browser may be used to determine which of the one or more stored browser operations from operation 110 of FIG. 1 and operation 150 of FIG. 2 may be used.

The shadow DOM may allow the component author to create an encapsulated sub-DOM tree for the component. The shadow document may be closed, which hides the access to the shadow root. This may allow for the component author to have control over how the shadow root is exposed. In implementations of the disclosed subject matter, the closed shadow DOM may be configured so that it is not publicly available or discoverable (e.g., the closed shadow DOM may be kept within a function). Generating a closed shadow DOM using the stored operations may configure the DOM to receive the sensitive data or restricted data for the web page and minimize the ability of a malicious third-party attacker from accessing the sensitive data or restricted data. That is, even if a malicious third-party overriding the web browser API and replaces the browser default operations in an attempt to gain control of any closed shadow DOMs that are created, implementations of the disclosed subject matter use the original operations of the browser that are stored to generate the closed shadow DOMs, which prevents access to such DOMs by third parties. By using the web browser operations stored at operation 110, no other operations may be used (e.g., operations that have been inserted by malicious third-parties) in the creation of the closed shadow DOM.

At operation 130, an inline frame (iFrame) with a same domain as the component may be instantiated by the component of the web page that receives the sensitive data or restricted data at the computer. That is, the domain of the component and the iFrame may be the same. The domain may be an identification string that defines a realm of administrative autonomy, authority, or control within the Internet. Domains, which may include domain names, may be used in computer networks and for application-specific naming and addressing purposes. A domain name identifies a network domain, or it may represent an Internet Protocol (IP) resource, such as a personal computer used to access the Internet, a server computer hosting a website, the web site itself, and/or any other service communicated via the Internet. Having the domain of the component and the iFrame be the same, along with the generation of the shadow DOM using the stored operations, may minimize the ability of a malicious third-party attacker from accessing the sensitive data or restricted data.

At operation 140, the web page to receive the sensitive data or restricted data may be displayed on the display of the computer. The web page may receive the sensitive data or restricted data via the instantiated iFrame from an input device communicatively coupled to the computer for a component of the web page. The input device may be user input device 560 of computer 500 shown in FIG. 5.

FIG. 3 shows optional example operations of the example method 100 according to implementations of the disclosed subject matter. At operation 170, the closed shadow DOM may be used to prohibiting other web components from accessing the instantiated iFrame. At optional operation 180, the instantiated iFrame may prevent an application program interface (API) of a web browser that displays the web page from being changed by third-party operations. At operation 190, the closed shadow DOM may prevent the instantiated iFrame from being available to the rest of the web page.

Figure 4:
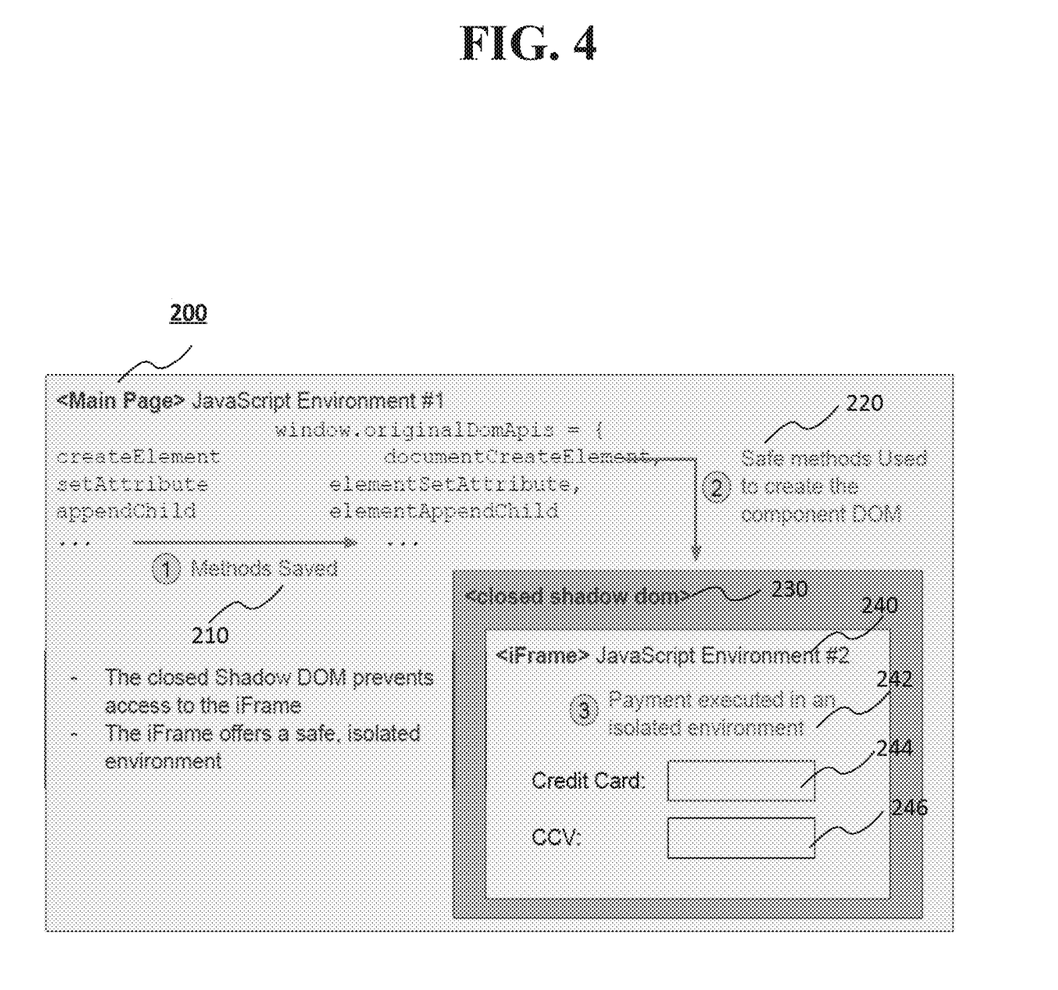
FIG. 4 shows example of a web page that use the operations of FIG. 1 to generate and display a closed shadow DOM to receive sensitive or restricted data according to an implementation of the disclosed subject matter.

FIG. 4 shows example of a web page 200 that use the operations of FIG. 1 to generate and display a closed shadow DOM to receive sensitive or restricted data according to an implementation of the disclosed subject matter. In some implementations, the web page 200 may be a first JavaScript™ environment. Methods saved 210 shows that original web browser operations such as createElement, setAttribute, appendChild, elementSetAttribute, and/or elementAppendChild, or the like may be saved, as described above in connection with operation 110 of FIG. 1. At 220, one or more of the saved operations may be used to create a component DOM, such as the closed shadow DOM 230. This may be similar to operation 120 described above in connection with FIG. 1. As discussed above in connection with operation 130, an iFrame 240 may be created within the closed shadow DOM 230. In some implementations, the iFrame 240 may be a second JavaScript™ environment. The closed shadow DOM may prevent access to the iFrame, and the iFrame may provide a safe, isolated environment to receive sensitive data from a user. The closed shadow DOM 230 and the iFrame 240 are generated and configured so that any script and/or code that is inserted by a malicious third-party into the main web page 200 cannot pierce the closed shadow DOM 230.

In the example shown in web page 200, a payment 242 may be executed in the isolated environment of the iFrame 240. The web page 200 may receive credit card information 244 and CCV (card verification value) code 246 from a user input device (e.g., user input device 560 of computer 500 shown in FIG. 5).

The code for the closed shadow DOM 230 may be minimal, and may delegate to the code within the iFrame 240. The second Javascript™ environment of the iFrame 240 may be a secure Javascript™ environment. The saved original browser operations may be used in the creation of the iFrame 240.

Figure 5:
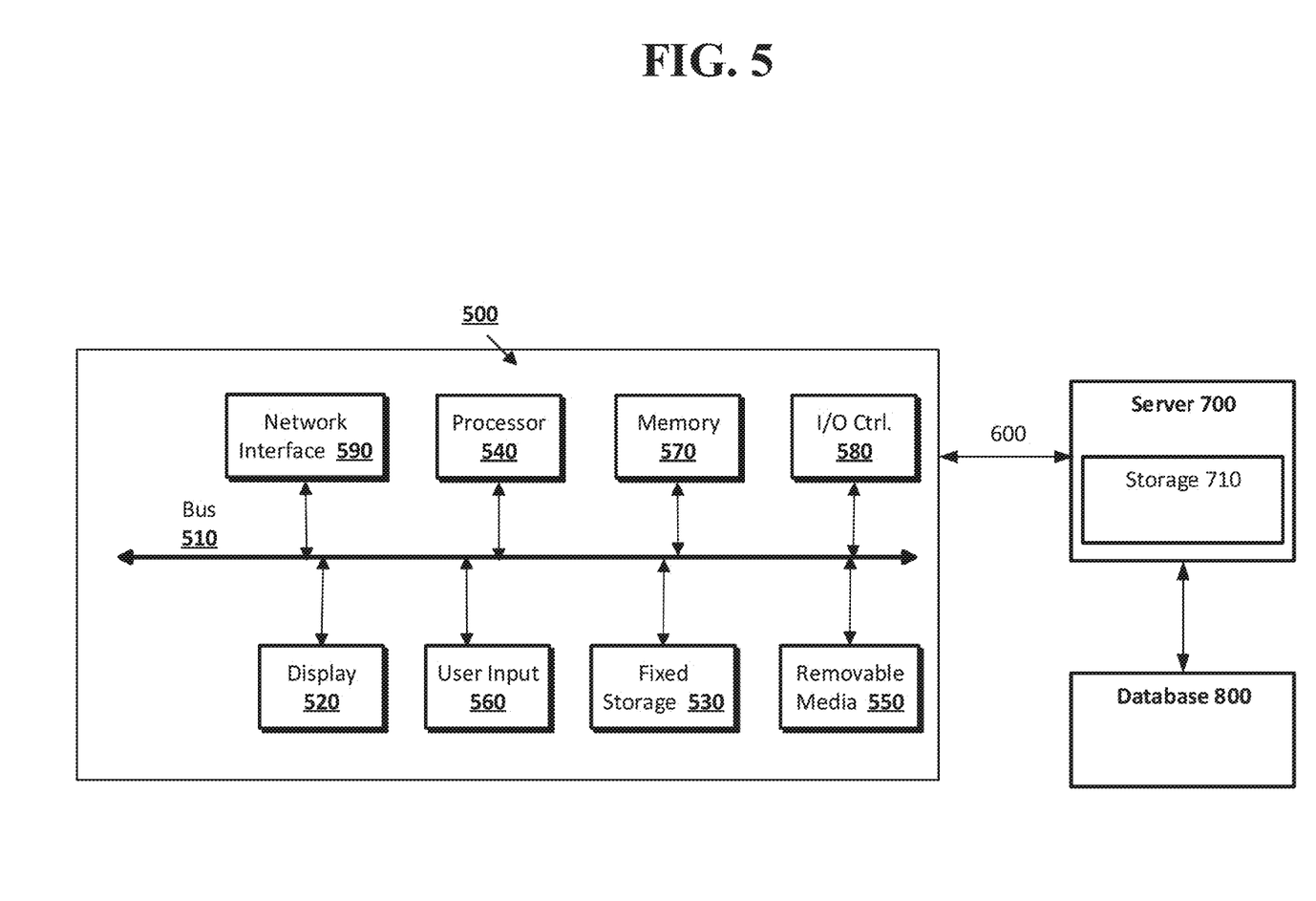
FIG. 5 shows an example system according to an implementation of the disclosed subject matter.

Implementations of the presently disclosed subject matter may be implemented in and used with a variety of component and network architectures. FIG. 5 is an example computer 500 which may generating a closed shadow document object model (DOM), instantiating an inline frame (iFrame), and displaying a web page to receive sensitive or restricted data based on the example methods shown in FIGS. 1-3 and described above.

As shown in FIG. 5, the computer 500 may communicate with a server 700 (e.g., a server, cloud server, database, cluster, application server, neural network system, or the like) via a wired and/or wireless communications network 600. Although one server 700 is shown in FIG. 8, the server 700 may be a plurality of servers, cloud servers, databases, clusters, application servers, neural network systems, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 800, which may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the server 700 and/or the database 800 may store data to be provided to a web page displayed in the web browser on display 520 of computer 500. Further, if the storage 710 and/or database 800 is a multitenant system, the storage 710 and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multi-tenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "generating," "instantiating," "displaying," "retrieving," "preventing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   storing, at a storage device communicatively coupled to a computer, one or more operations to be executed for a web browser;
   generating, at the computer, a closed shadow document object model (DOM) by a component of a web page to be displayed in the web browser using the one or more of the stored operations, wherein the closed shadow DOM is configured to receive sensitive data or restricted data;
   instantiating, by the component of the web page that receives the sensitive data or restricted data at the computer, an inline frame (iFrame) with a same domain as the component;
   displaying, on a display communicatively coupled to the computer, the web page to receive the sensitive data or restricted data via the instantiated iFrame from an input device communicatively coupled to the computer for a component of the web page;
   preventing, using the instantiated iFrame, an application program interface (API) of a web browser that displays the web page from being changed by third-party operations; and
   preventing the instantiated iFrame from being available to the rest of the web page based on the closed shadow DOM by configuring the closed shadow DOM to be kept within a function to prevent it from being publicly available or discoverable.

2. The method of claim 1, wherein the one or more operations comprise at least one selected from the group consisting of: creating an element of the web page (createElement), setting a value for an attribute on a specified element of the web page (setAttribute), attaching a shadow DOM tree to an element (attachShadow), adding a node to an end of a list of child nodes of a parent node (appendChild), and adding an event handler to listen for an event and execute an operation when the event occurs (addEventListener).

3. The method of claim 2, further comprising:
retrieving, at the computer from the storage device, at least one of the one or more operations based on an application.

4. The method of claim 1, further comprising:
prohibiting other web components from accessing the instantiated iFrame using the closed shadow DOM.

5. The method of claim 1, wherein the sensitive data or restricted data is at least one selected from the group consisting of: a password, bank account information, credit card information, financial account information, personal medical information, and personal identification information.

6. A system comprising:
a computer comprising a processor coupled to a memory to:
store, at a storage device communicatively coupled to the computer, one or more operations to be executed for a web browser;
generate a closed shadow document object model (DOM) by a component of a web page to be displayed in the web browser using the one or more of the stored operations, wherein the closed shadow DOM is configured to receive sensitive data or restricted data;
instantiate, by the component of the web page that receives the sensitive data or restricted data at the computer, an inline frame (iFrame) with a same domain as the component;
display, on a display communicatively coupled to the computer, the web page to receive the sensitive data or restricted data via the instantiated iFrame from an input device communicatively coupled to the computer for a component of the web page;
prevent, using the instantiated iFrame, an application program interface (API) of a web browser that displays the web page from being changed by third-party operations; and
prevent the instantiated iFrame from being available to the rest of the web page based on the closed shadow DOM by configuring the closed shadow DOM to be kept within a function to prevent it from being publicly available or discoverable.

7. The system of claim 6, wherein the one or more operations stored at the storage device and used to generate the closed shadow DOM comprise at least one selected from the group consisting of: create an element of the web page (createElement), set a value for an attribute on a specified element of the web page (setAttribute), attach a shadow DOM tree to an element (attachShadow), add a node to an end of a list of child nodes of a parent node (appendChild), and add an event handler to listen for an event and execute an operation when the event occurs (addEventListener).

8. The system of claim 7, further comprising:
retrieving, at the computer from the storage device, at least one of the one or more operations based on an application.

9. The system of claim 6, wherein the computer prohibits other web components from accessing the instantiated iFrame using the closed shadow DOM.

10. The system of claim 6, wherein the sensitive data or restricted data is at least one selected from the group consisting of: a password, bank account information, credit card information, financial account information, personal medical information, and personal identification information.

* * * * *